United States Patent Office 3,258,097
Patented June 28, 1966

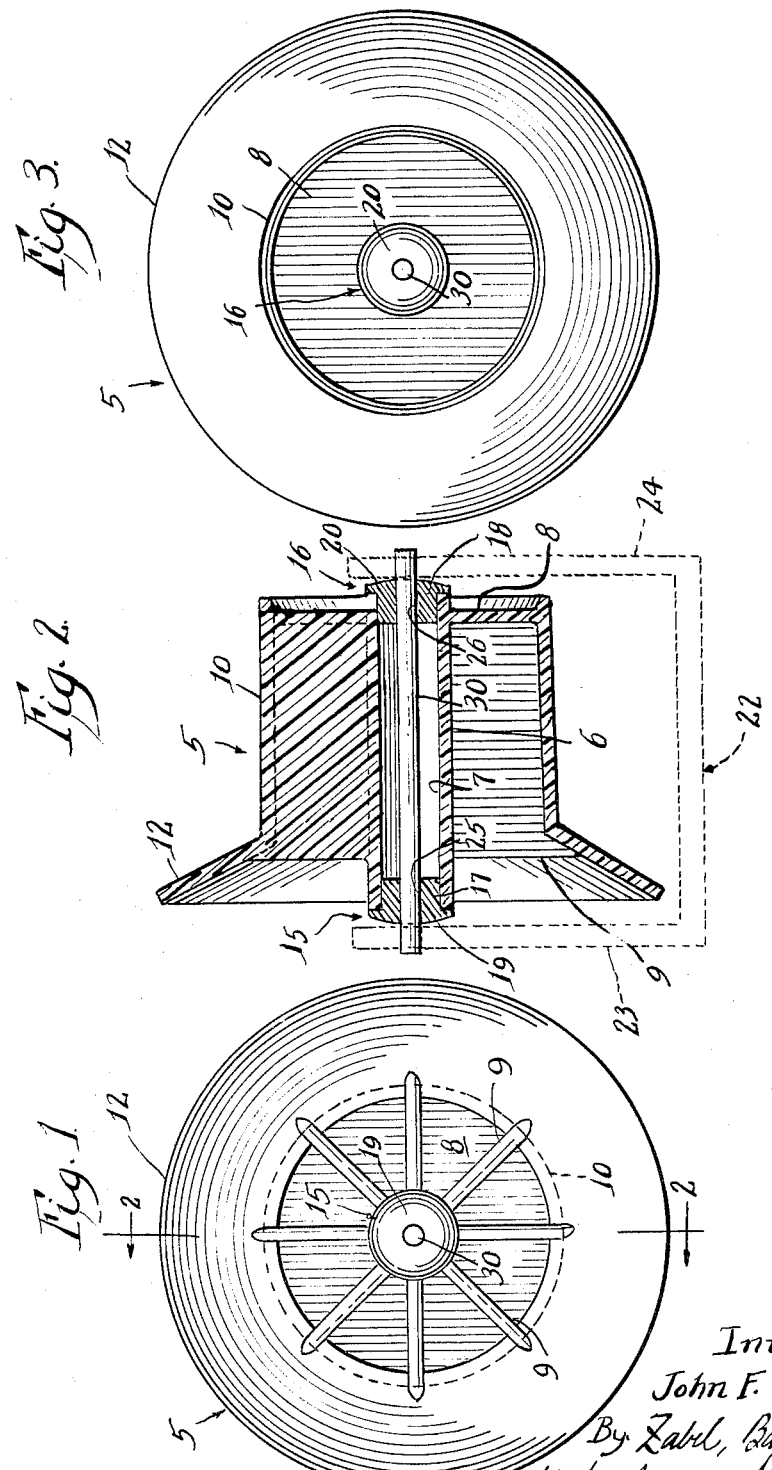

3,258,097
LOW FRICTION FLOW ROLLER ASSEMBLY
John F. Wahl, Sterling, Ill., assignor to Mallard Plastics, Inc., Sterling, Ill., a corporation of Illinois
Filed May 13, 1964, Ser. No. 367,140
1 Claim. (Cl. 193—37)

This invention relates to a low friction flow roller assembly, and involves an alteration of the flow roller shown in my U.S. Patent No. 3,117,662, dated January 14, 1964.

The flow roller of my aforesaid patent has been used successfully in numerous storage rack and conveyor installations. The low cost, light weight and durability of the flow roller have contributed greatly to its wide and continued use.

A significantly number of flow rack and conveyer installations are designed for storing and conveying items of comparatively light weight, such as packages containing bakery products and paper napkins, for example. In installations utilizing gravity flow of such items, it is necessary for the flow rollers to have an extremely low friction characteristic if the angle of incline is not to be excessive.

One object of the invention is to provide a low friction flow roller assembly that employs the same flow roller which in its normal mode of use possesses a friction characteristic of unacceptable magnitude.

Another object is to provide inexpensive bushing members of durable low friction material that are effective to convert standard flow rollers into rollers having an extremely low friction characteristic.

Still another object is to provide bushing members of the aforesaid character that have spherical bearing heads, producing a low friction relation with adjacent supporting structure.

Other objects, advantages and details of the invention will be apparent as the description proceeds, reference being had to the accompanying drawing wherein one form of the invention is shown. It will be understood that the description and drawing are illustrative only and that the scope of the invention is to be measured by the appended claim.

In the drawing:

FIG. 1 is an elevational view of the outer end of a low flow roller assembly embodying the invention.

FIG. 2 is a sectional view on irregular line 2—2 of FIG. 1, typical supporting structure being shown in broken line.

FIG. 3 is an elevational view of the inner end of the flow roller assembly.

Referring to the drawing, the illustrated flow roller assembly includes a flow roller 5 of the general type shown in the said U.S. Patent 3,117,662. Flow roller 5 has a central tubular portion or hub 6 (FIG. 2) with an axial opening 7 adapted to receive an associated axle. The diameters of axial opening 7 and the axle designed therefore are of such size, e.g. five-sixteenths inch, and the area of contact between hub and axle so great, that friction of unacceptable amount for certain purposes exists between the hub and axle.

The illustrated flow roller 5 also includes a transverse disk portion 8, angularly spaced radial web portions 9, cylindrical portion 10 and annular flange 12, all as described in greater detail in the aforesaid patent.

The present assembly also includes a pair of identical bushing members 15 and 16. As best shown in FIG. 2, bushing member 15 is associated with the outer end of tubular portion 7, while bushing member 16 is associated with the inner end of the member.

Each bushing member 15, 16 is formed of durable low friction material, preferably a plastic material having a self-lubricating characteristic such as nylon. The bushing members respectively have cylindrical body portions 17 and 18 of comparatively short length that are secured in the respective ends of the axial opening in hub 6. In preferred form, the bushing members are secured in place by means of a press fit.

In the form of the invention shown, the external ends of bushing members 15 and 16 comprise heads 19 and 20, the outer surfaces of which are spherical in shape to provide low friction relation with associated supporting structure.

Such supporting structure may take the form of an upwardly facing channel 22, as shown in broken line in FIG. 2. Bushing members 15 and 16 have small clearance with sides 23 and 24 of channel 22, and there will be bearing engagement between one or the other of the bushing members and the channel sides during operation of the roller assembly.

Bushing members 15 and 16 respectively have axial openings 25 and 26. The diameters of these axial openings are such as to receive a metallic axle 30 having minimum diameter, e.g. one-eighth inch, for the stress requirements of the flow roller installation. As shown in FIG. 2, the axle is supported at its ends by sides 23 and 24 of channel 22, thereby locating the supports adjacent the axle regions of greatest load and allowing the axle diameter to be smaller than otherwise.

The relatively small diameters of axial openings 25, 26 and axle 30, and the comparatively short lengths of bushings members 15 and 16, minimize the area of bearing engagement between axle 30 and flow roller 6, thereby minimizing the amount of friction and enabling roller 6 to function properly to convey items of extremely light weight.

From the above description it is thought that the construction and advantages of this invention will be readily apparent to those skilled in the art. Various changes in detail may be made without departing from the spirit or losing the advantages of the invention.

Having thus described the invention, what is claimed as new and desired to secure by Letters Patent is:

A low friction flow roller assembly comprising:
an elongated roller member including a hub having a cylindrical axial opening of such large diameter that friction of unacceptable amount exists between the hub and an axle of cooperating diameter;
a relatively short bushing member of durable low friction material secured in non-rotatable manner in each end of said axial opening, each bushing member having an axial opening of diameter adapted to receive for low friction relative rotation a metallic axle having minimum diameter for requisite strength, the external end of each bushing member having a generally spherical outer surface for low friction relation with axle supporting means; and
a metallic axle of such minimum diameter extending through said bushing member openings.

References Cited by the Examiner
UNITED STATES PATENTS

| 523,483 | 7/1894 | Pauly | 193—37 |
| 2,307,874 | 1/1943 | Bilde. | |
| 2,913,284 | 11/1959 | Zankl | 193—37 X |
| 2,983,352 | 5/1961 | De Flora et al. | 193—35 |
| 3,117,662 | 1/1964 | Wahl et al. | 193—37 |

FOREIGN PATENTS 754,115  8/1956  Great Britain.

EVON C. BLUNK, *Primary Examiner.*
SAMUEL F. COLEMAN, *Examiner.*
A. L. LEVINE, *Assistant Examiner.*